(12) United States Patent
Lee et al.

(10) Patent No.: US 10,960,778 B2
(45) Date of Patent: Mar. 30, 2021

(54) POWER RECEPTION APPARATUS HAVING BRIDGELESS RECTIFIER IN ELECTRIC VEHICLE WIRELESS POWER TRANSFER SYSTEM

(71) Applicants: Hyundai Motor Company, Seoul (KR); Kia Motors Corporation, Seoul (KR); Research & Business Foundation Sungkyunkwan University, Gyeonggi-do (KR)

(72) Inventors: Woo Young Lee, Gyeonggi-do (KR); Jae Eun Cha, Gyeonggi-do (KR); Gyu Yeong Choe, Gyeonggi-do (KR); Jong Pil Kim, Gyeonggi-do (KR); Min Jung Kim, Gyeonggi-do (KR); Jong Eun Byun, Gyeonggi-do (KR); Min Kook Kim, Gyeonggi-do (KR); Sang Joon Ann, Gyeonggi-do (KR); Byoung Kuk Lee, Gyeonggi-do (KR)

(73) Assignees: Hyundai Motor Company, Seoul (KR); Kia Motors Corporation, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 15 days.

(21) Appl. No.: 16/299,556

(22) Filed: Mar. 12, 2019

(65) Prior Publication Data
US 2019/0283615 A1    Sep. 19, 2019

(30) Foreign Application Priority Data
Mar. 16, 2018  (KR) .......................... 10-2018-0030679

(51) Int. Cl.
 *H02J 7/02*  (2016.01)
 *H02J 50/10*  (2016.01)
 (Continued)

(52) U.S. Cl.
 CPC ............... *B60L 53/12* (2019.02); *B60L 53/22* (2019.02); *H02J 7/025* (2013.01); *H02J 50/10* (2016.02);
 (Continued)

(58) Field of Classification Search
 CPC .......... B60L 53/12; B60L 53/20; B60L 53/22; H02J 7/025; H02J 7/045; H02J 50/10;
 (Continued)

(56) References Cited

U.S. PATENT DOCUMENTS

2013/0188405 A1* 7/2013 Jin ........................ H02M 7/217
 363/49
2013/0293192 A1* 11/2013 Abe ....................... B60L 53/122
 320/108

(Continued)

OTHER PUBLICATIONS

Kim, et al. "A Control of Mistuned Resonant Newwork of Inductive Power Transfer System with Bridgeless Rectifer", Sungkyunkwan University, Department of Electrical and Computer Engineering, Nov. 2017.

(Continued)

*Primary Examiner* — Levi Gannon
(74) *Attorney, Agent, or Firm* — Mintz Levin Cohn Ferris Glovsky and Popeo, P.C.; Peter F. Corless

(57) ABSTRACT

A wireless power reception apparatus including a bridgeless rectifier in a wireless power transfer (WPT) system for an electric vehicle (EV) may include: a bridgeless rectifier configured to rectify power transferred from a reception coil (Continued)

and to supply a direct current to a battery mounted in the EV; and a controller configured to control operation of the bridgeless rectifier. The bridgeless rectifier may include at least one switch and at least one diode connected to the at least one switch.

12 Claims, 9 Drawing Sheets

(51) Int. Cl.
*H02M 7/23* (2006.01)
*B60L 53/12* (2019.01)
*H02M 7/12* (2006.01)
*H02J 50/90* (2016.01)
*B60L 53/22* (2019.01)

(52) U.S. Cl.
CPC ............... *H02J 50/90* (2016.02); *H02M 7/12* (2013.01); *H02M 7/23* (2013.01); *H02J 2207/20* (2020.01)

(58) Field of Classification Search
CPC .. H02J 50/12; H02J 50/80; H02J 50/90; H02J 2207/20; H02M 7/12; H02M 7/21; H02M 7/217; H02M 7/23
USPC ........................................................ 307/104
See application file for complete search history.

(56) References Cited

U.S. PATENT DOCUMENTS

| | | | |
|---|---|---|---|
| 2013/0308356 A1* | 11/2013 | Subramanium | H02J 3/381 363/53 |
| 2014/0054970 A1* | 2/2014 | Keeling | H02J 7/025 307/104 |
| 2015/0303703 A1* | 10/2015 | Hayashi | H02J 7/022 307/104 |
| 2017/0025864 A1* | 1/2017 | Chen | H02M 7/06 |
| 2017/0240056 A1* | 8/2017 | Elshaer | B60L 53/12 |
| 2018/0248489 A1* | 8/2018 | Wang | H02M 7/217 |
| 2019/0089199 A1* | 3/2019 | Hosotani | H02J 50/10 |
| 2019/0165611 A1* | 5/2019 | Miyazawa | H02M 3/335 |

OTHER PUBLICATIONS

Son, et al. "Performance Analysis of Bridgeless Rectifier for Inductive Power Transfer System to Compensate Resonance Frequency Variation", Power Electronics Annual Conference, Nov. 2017, pp. 129-130.

* cited by examiner

POWER RECEPTION APPARATUS HAVING BRIDGELESS RECTIFIER IN ELECTRIC VEHICLE WIRELESS POWER TRANSFER SYSTEM

CROSS-REFERENCE TO RELATED APPLICATION

The present application claims the benefit of priority to Korean Patent Application No. 10-2018-0030679, filed on Mar. 16, 2018 in the Korean Intellectual Property Office (KIPO), the entire contents of which are incorporated herein by reference.

TECHNICAL FIELD

The present disclosure relates to a power reception apparatus in wireless power transfer (WPT) system for an electric vehicle (EV) (hereinafter "EV WPT system"), and more specifically, to techniques for charging a battery through control of a bridgeless rectifier in a power reception circuit of the EV WPT system.

BACKGROUND

An electric vehicle (EV) charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type").

When charging an EV wirelessly, a reception coil in a vehicle assembly (VA) mounted in the EV forms an inductive resonant coupling with a transmission coil in a group assembly (GA) located in a charging station or a charging spot. Electric power is then transferred from the GA to the VA to charge the high-voltage battery of the EV through the inductive resonant coupling.

In order to reduce a rating of the VA and achieve maximum power transfer, the WPT system may make the respective resonance frequencies of the primary and secondary sides coincide with each other, and operate the operation frequency of the system according to the resonance frequency. Also, an output voltage received through a power reception pad from a power transmission pad may be used to generate a necessary voltage for the battery mounted in the EV using a direct current (DC)-to-DC converter. A buck-boost converter has been used conventionally as the DC-to-DC converter. However, the buck-boost converter includes additional switches and inductors, thereby increasing its volume. Thus, a reduction of power density and degradation of power transfer efficiency may occur.

SUMMARY

Embodiments of the present disclosure provide a power reception apparatus including a bridgeless converter in an EV WPT system.

Also, embodiments of the present disclosure provide a controller for controlling a bridgeless rectifier that rectifies a power transferred from a reception coil and supplies a DC current to a battery mounted in an EV.

According to embodiments of the present disclosure, a wireless power reception apparatus including a bridgeless rectifier in an electric vehicle (EV) wireless power transfer (WPT) system may include: a bridgeless rectifier configured to rectify power transferred from a reception coil and to supply a direct current to a battery mounted in the EV; and a controller configured to control operation of the bridgeless rectifier. The bridgeless rectifier may include at least one switch and at least one diode connected to the at least one switch.

The bridgeless rectifier may include a first series circuit in which a first switch and a first diode are connected in series; and a second series circuit in which a second switch and a second diode are connected in series and configured in parallel with the first series circuit.

The bridgeless rectifier may receive the power transferred from the reception coil using one terminal between the first switch and the first diode and another terminal between the second switch and the second diode.

The power transferred from the reception coil may be received through a compensation network.

The controller may control the operation of the bridgeless rectifier by adjusting a switching time and a period of the at least one switch.

The wireless power reception apparatus may further comprise an ammeter sensing at least one of a current transferred from the reception coil and a current supplied to the battery.

The wireless power reception apparatus may further comprise a voltmeter for sensing a voltage of the battery.

The controller may control operation of the first switch and the second switch based on the current transferred from the reception coil, such that an operation frequency of the bridgeless rectifier matches a resonance frequency of the reception coil.

The controller may control operation of the first switch and the second switch based on the voltage of the battery, such that a pulse width $\beta$ of a voltage transferred from the reception coil changes.

The controller may control operation of the first switch and the second switch based on an output power of the battery, such that a pulse width $\alpha$ of a voltage transferred from the reception coil changes.

Furthermore, according to embodiments of the present disclosure, an apparatus for controlling operation of a bridgeless rectifier configured to rectify power transferred from a reception coil and to supply a direct current to a battery mounted in an electric vehicle (EV may include at least one processor and a memory storing at least one instruction executable by the at least one processor. Upon execution of the at least one instruction, the at least one processor may be configured to sense a power transferred from the reception coil or an output power supplied to the battery; and control the operation of the bridgeless rectifier based on the sensed power transferred from the reception coil or output power supplied to the battery.

The at least one processor may control operation of at least one switch included in the bridgeless rectifier based on a current transferred from the reception coil.

The at least one processor may control operation of at least one switch included in the bridgeless rectifier based on a voltage of the battery.

The at least one processor may control operation of at least one switch included in the bridgeless rectifier based on an output power of the battery.

The at least one processor may control operation of the at least one switch based on the current transferred from the reception coil, such that an operation frequency of the bridgeless rectifier matches a frequency of the power transferred from the reception coil.

The at least one processor may control operation of the at least one switch based on the voltage of the battery, such that a pulse width β of a voltage transferred from the reception coil changes.

The at least one processor may control operation of the at least one switch based on an output power of the battery, such that a pulse width α of a voltage transferred from the reception coil changes.

Using the power reception apparatus including the bridgeless rectifier in the EV WPT system according to the present disclosure as described above, the power density can be increased as the hardware volume is reduced. Also, since a DC-to-DC converter is not used, the WPT efficiency can be improved. Further, the phase difference between the input voltage and the input current in the power transmission side can be compensated only by controlling the bridgeless rectifier. Further yet, independent control can be performed on the wireless power reception side regardless of the control on the wireless power transmission side, and the WPT can be controlled even in a wide inductance fluctuation situation.

BRIEF DESCRIPTION OF DRAWINGS

Embodiments of the present disclosure will become more apparent by describing in detail embodiments of the present disclosure with reference to the accompanying drawings, in which.

Figure 1:
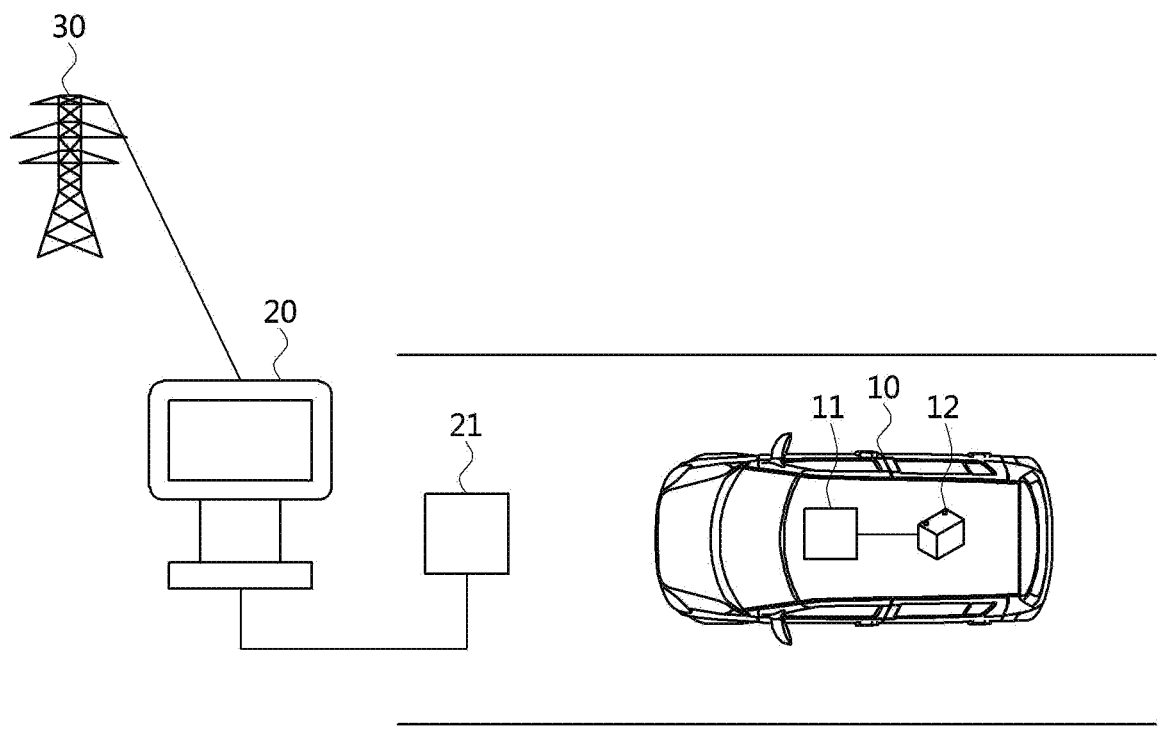
FIG. 1 is a conceptual diagram illustrating a concept of a wireless power transfer (WPT) to which embodiments of the present disclosure are applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

According to embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may include an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device (PD)": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device (SD)": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440) "Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High-level communication (HLC)": HLC is a special kind of digital communication. HLC is necessary for additional services which are not covered by command & control communication. The data link of the HLC may use a power line communication (PLC), but it is not limited.

"Low-power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

According to embodiments of the present disclosure, "rapid charging" may refer to a method of directly converting AC power of a power system to DC power, and supplying the converted DC power to a battery mounted on an EV. Here, a voltage of the DC power may be DC 500 volts (V) or less.

According to embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

Hereinafter, embodiments of the present disclosure will be explained in detail by referring to accompanying figures.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10.

Here, the wireless communications may be Bluetooth, Zigbee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

In the present disclosure, the transmission pad 21 or the reception pad 11 may collectively be referred to as a "wireless charging pad."

Figure 2:
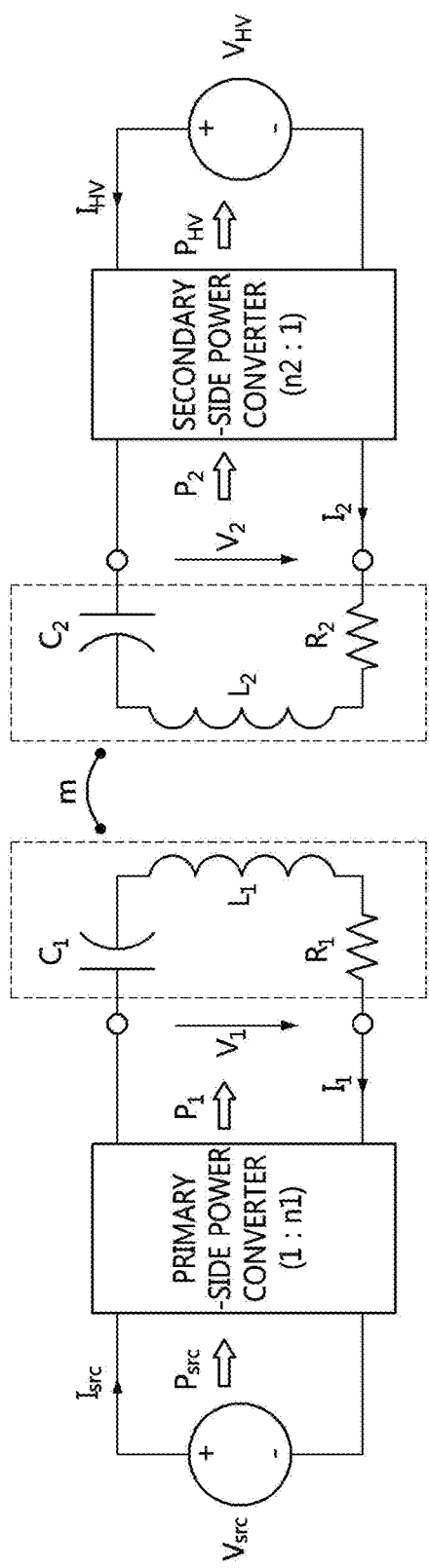
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Also, the transmission coil may be referred to also as a GA coil, and the reception coil may be referred to also as a VA coil. Therefore, positioning between the transmission pad and the reception pad or positioning between the EV and the transmission pad will be described below with reference to the drawings.

Figure 3:
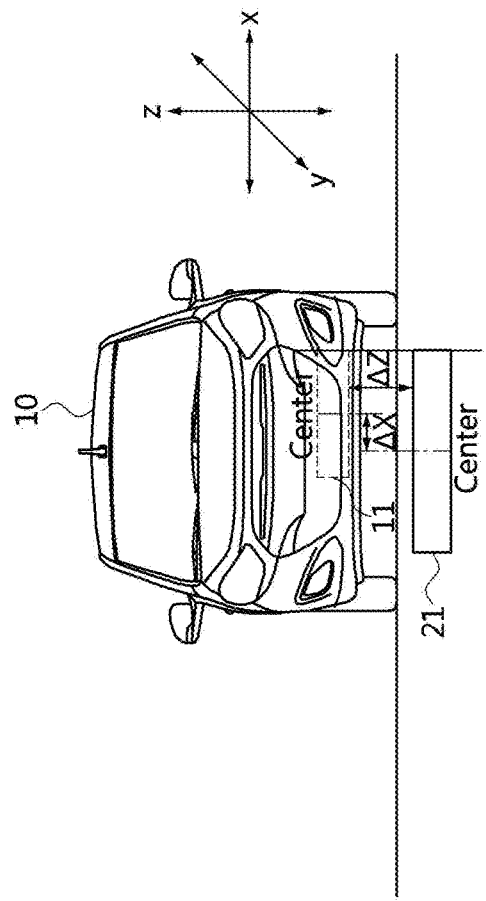
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, positional alignment may correspond to the alignment, which is the above-mentioned term, and thus may be defined as positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

The height of the reception pad measured from the ground surface may correspond to the previously defined term "vehicle magnetic ground clearance."

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

Here, the relative positions of the power transmission pad 21 and the power reception pad 11 may be varied in accordance with their experimental results, and the numerical values should be understood as exemplary.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4:
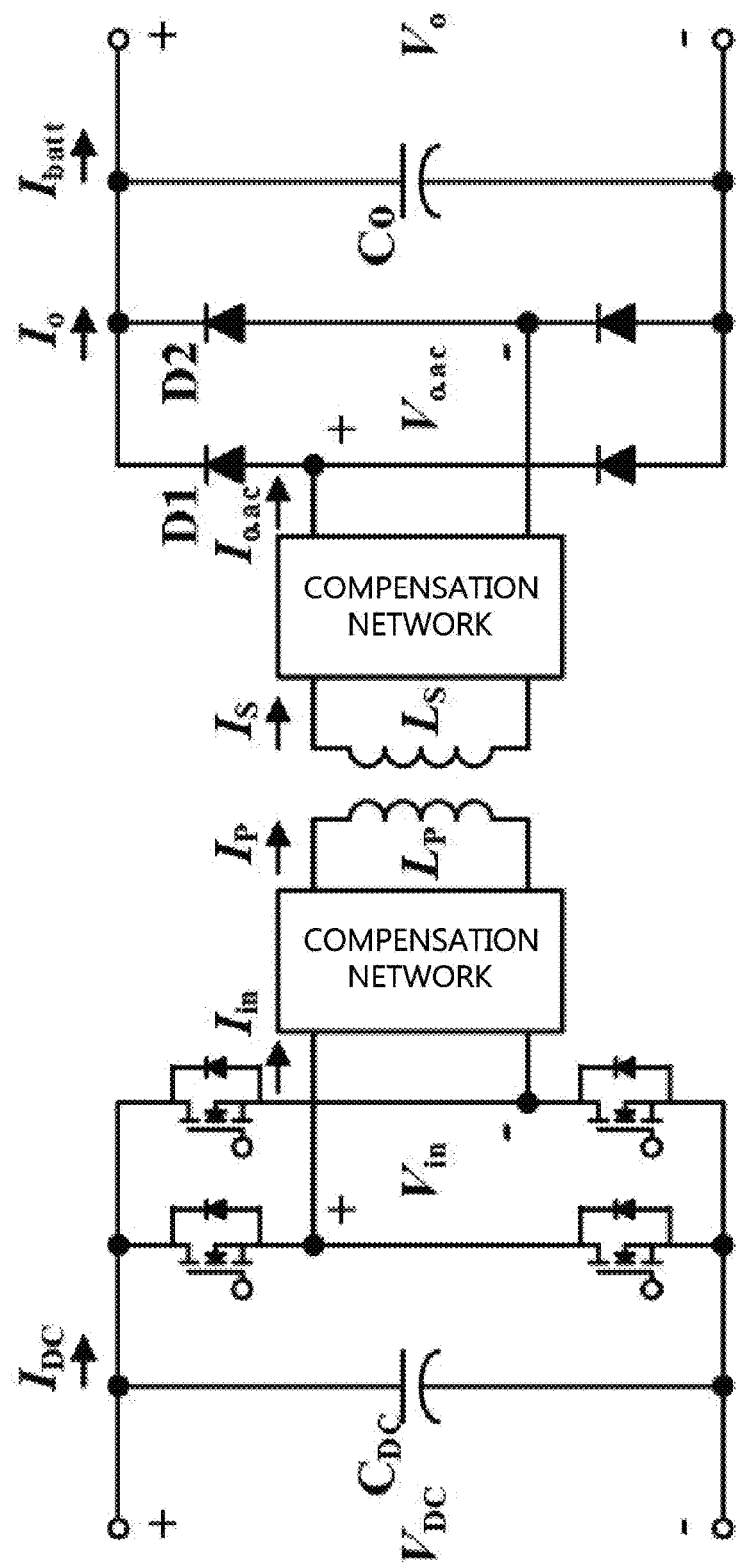
FIG. 4 is a diagram illustrating an embodiment of an EV WPT circuit according to embodiments of the present disclosure.

FIG. 4 is a diagram illustrating an embodiment of an EV WPT circuit according to embodiments of the present disclosure.

As shown in FIG. 4, when a power is supplied from a DC input power supply VDC, a supplied current $I_{DC}$ may be received as an input power $V_{in}$ and $I_{in}$ of a transmission coil $L_P$ through an inverter composed of a plurality of metal oxide semiconductor field effect transistors (MOSFETs) or the like, and the input power $V_{in}$ and $I_{in}$ may be transferred to the transmission coil $L_P$ through a compensation network. Also, the transmission coil according to the DC input power may correspond to the power transmission pad or the ground assembly described above. Also, the inverter may convert the supplied DC power into AC.

On the other hand, when a current Is by an induction electromotive force is generated in a reception coil $L_S$ magnetically coupled to the transmission coil $L_P$, the generated current $I_S$ may pass through a compensation circuit (i.e., compensation network), and may be output as a power $I_{o.ac}$ and $V_{o.ac}$. The power $I_{o.ac}$ and $V_{o.ac}$ may be applied to a rectifying circuit composed of a plurality of diodes (i.e., D1, D2, and the like). A current $I_o$ rectified as a DC power by the rectifying circuit may be charged to a capacitor $C_o$, and a power $I_{batt}$ and $V_o$ by the charged capacitor may be used to charge the battery built in the EV.

Figure 5A:
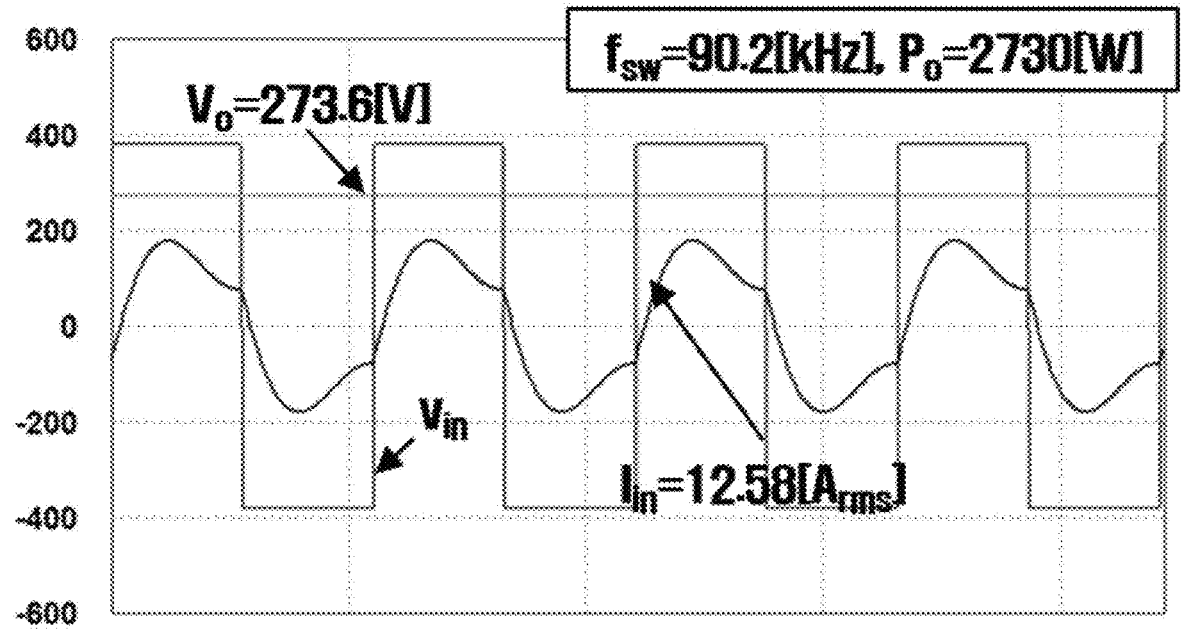
FIGS. 5A and 5B are graphs illustrating circuit operation waveforms according to operation frequencies for a WPT circuit according to FIG. 4.
Figure 5B:
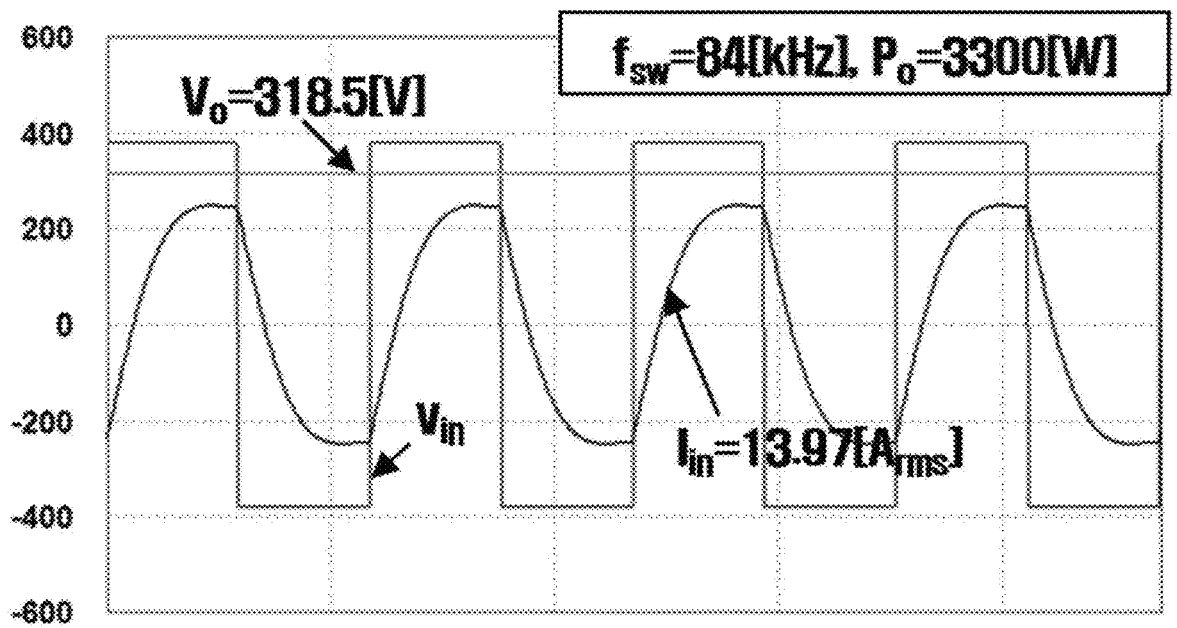

FIGS. 5A and 5B are graphs illustrating circuit operation waveforms according to operation frequencies for a WPT circuit according to FIG. 4.

The EV WPT system should transfer the maximum power to the VA while reducing a rated voltage of the VA. Therefore, a primary side resonance frequency of the GA and a secondary side resonance frequency of the VA are designed to be the same, and the operation frequency of the WPT system may be operated according to the resonance frequency.

However, the degree of magnetic coupling for the WPT may vary depending on the structure and mutual positions of the transmission pad and the reception pad. For example, unlike a typical transformer, since the transmission pad and the reception pad transfer magnetic fluxes through air, the closer the transmission pad and the reception pad are, the stronger the magnetic coupling becomes, and the farther away the transmission pad and the reception pad are, the weaker the magnetic coupling becomes. Such the change in the magnetic coupling may change the inductances of the transmission pad and the reception pad, and may affect the primary side resonance frequency and the secondary side resonance frequency.

Here, when the operation frequency is controlled to be equal to the primary side resonance frequency, it is possible to reduce the VA rating by reducing a phase difference between a primary input voltage and a primary input current, but the power transfer may be made difficult. On the other hand, when the operation frequency is controlled to be equal to the secondary side resonance frequency, the power transfer may be made possible. However, if the resonance frequencies of the primary side and the secondary side become different from each other, a phase difference between the primary input voltage and the primary input current may occur, and the VA rating may increase, thereby decreasing efficiency.

In the WPT circuit of FIG. 4 designed to have a resonance frequency of 85 kHz to test this situation, system operations according to the operation frequencies when the resonance frequency changes according to the positions of the transmission pad and the reception pad may be identified with reference to FIGS. 5A and 5B.

As shown in FIG. 5A, a waveform of the output voltage $V_o$ supplied to the battery of FIG. 4 when the operation frequency $f_{sw}$ is driven to be equal to the primary resonance frequency (i.e., resonance frequency of the GA side) may be identified. Specifically, in the WPT circuit of FIG. 4, the output voltage $V_o$ of the VA side according to the input voltage $V_{in}$ and the input current $I_{in}$ of the transmission coil $L_P$ may be identified. The phases of the input voltage and the input current are close to the same phase, but the output voltage $V_o$ is 273.6 V, which is somewhat low. Therefore, as the load increases, the output voltage may drop, so the power transfer to the battery (e.g., 2730 W) may not work well.

As shown in FIG. 5B, a waveform of the output voltage $V_o$ when the operation frequency $f_{sw}$ is driven to be equal to the secondary resonance frequency (i.e., resonance frequency of the VA side) may be identified. Specifically, since the output voltage $V_o$ is maintained at a relatively high value of 318.5 V, the relatively large power (3300 W) is transferred to the battery, but the phases of the input voltage $V_{in}$ and the input current $I_{in}$ do not match, and the rated power of the battery (or the VA) is shown to increase due to the increase of current, as compared with the rated power in FIG. 4A.

Therefore, in order to reduce the rated power of the VA side in the WPT system and efficiently transfer power, it is necessary to compensate the phase change of the primary side input voltage and current due to the change of the primary side resonance frequency and the secondary side resonance frequency.

Figure 6A:
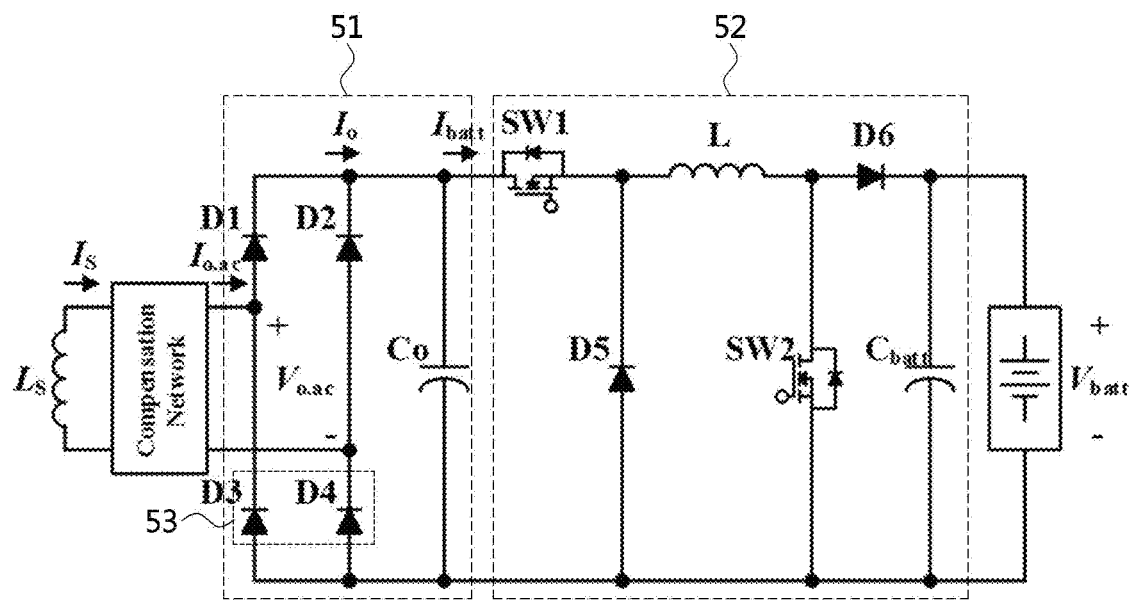
FIG. 6A is a diagram of an example circuit using a buck-boost converter in a wireless power reception circuit on a VA side according to embodiments of the present disclosure.

FIG. 6A is a diagram of an example circuit using a buck-boost converter in a wireless power reception circuit on a VA side according to embodiments of the present disclosure.

As shown in FIG. 6A, when an induction electromotive force is generated in the reception coil $L_S$ built in the reception pad of the EV, an output voltage $V_{o.ac}$ and an output current $I_{o.ac}$ may be generated through a compensation network. The output voltage and the output current may be converted into a DC power through a diode rectifier 51, the converted DC power $I_{batt}$ may be converted into a voltage $V_{batt}$ suitable for the battery through a DC-to-DC converter 52, and may be charged to the battery.

The diode rectifier 51 may include a first diode D1, a second diode D2, a third diode D3 and a fourth diode D4. A full-bridge diode rectifier including a capacitor $C_o$ may be used as the diode rectifier 51.

As the DC-to-DC converter 52, a buck-boost converter (e.g., cascade buck-boost converter) may be used. The buck-boost converter 52 is suitable for a battery charging system having a wide voltage and current range. The buck-boost converter has an advantage in that it can supply the voltage and current suitable for the battery for any output voltage (e.g., a voltage applied to the capacitor $C_o$) as long as the rated voltage and the step-up/down ratio of the converter are satisfied.

However, as shown in FIG. 6A, the buck-boost converter 52 has a problem in that the increase in volume due to the switches SW1 and SW2, the inductor L, and the like is large, thereby reducing the power density and the power transfer efficiency. Therefore, in an embodiment of the present disclosure, it is proposed to remove the DC-to-DC converter 52 and use a bridgeless rectifier instead of the conventional full-bridge diode rectifier 51.

Figure 6B:
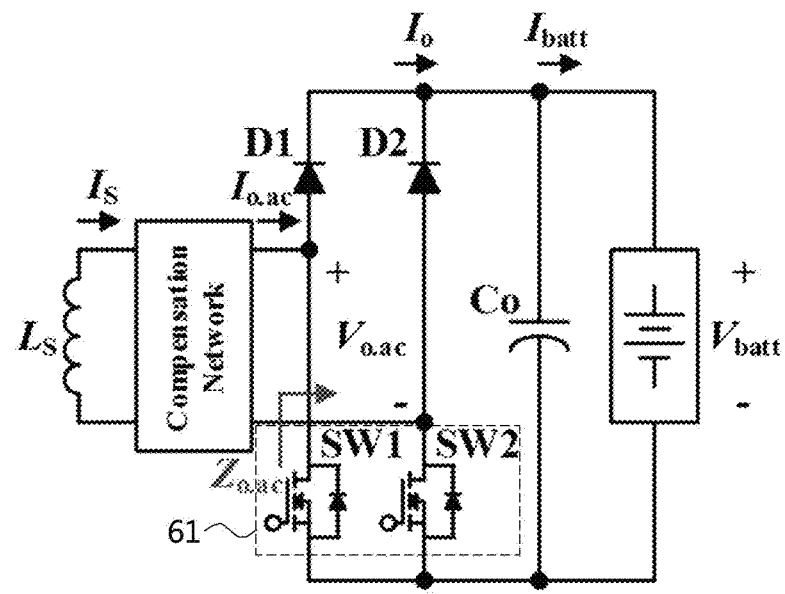
FIG. 6B is a diagram of an example circuit using a bridgeless rectifier in a wireless power reception circuit on a VA side according to embodiments of the present disclosure.

FIG. 6B is a diagram of an example circuit using a bridgeless rectifier in a wireless power reception circuit on a VA side according to embodiments of the present disclosure.

As shown in FIG. 6B, as compared to the wireless power reception circuit according to FIG. 6A, a circuit, in which a bridgeless rectifier is used instead of the diode rectifier, and the buck-boost converter is removed, may be identified. Specifically, the bridgeless rectifier may be configured by substituting a configuration 53 comprising the third diode D3 and the fourth diode D4 in the full-bride diode rectifier 51 with a configuration 61 comprising a first switch SW1 and a second switch SW2.

Here, a metal oxide semi-conductor field effect transistor (MOSFET), an insulated gate bipolar mode transistor (IGBT), or the like may be used as each of the first switch SW1 and the second switch SW2.

According to embodiments of the present disclosure, the output ($I_o$ or a voltage applied to $C_o$) supplied to the battery may be controlled through a pulse width modulation (PWM) using the first switch SW1 and the second switch SW2.

In addition, according to embodiments of the present disclosure, since the buck-boost circuit 52 according to FIG. 6A is removed, the volume may be greatly reduced and the power transfer efficiency may also be increased. However, since only a step-up is possible when the bridgeless rectifier is used without the buck-boost circuit 52, it is necessary to perform additional voltage control (or, DC link voltage control) in order to cope with the output voltage $V_{o.ac}$ varying depending on the coupling coefficient.

Figure 7A:
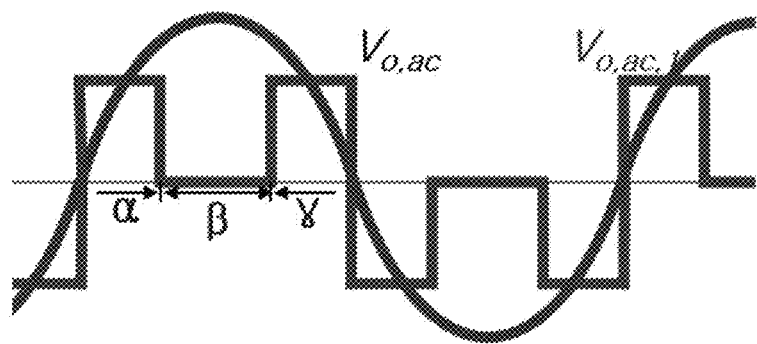
FIGS. 7A to 7C are graphs for explaining a method of performing control on switches in the wireless power reception circuit according to FIG. 6B.
Figure 7B:
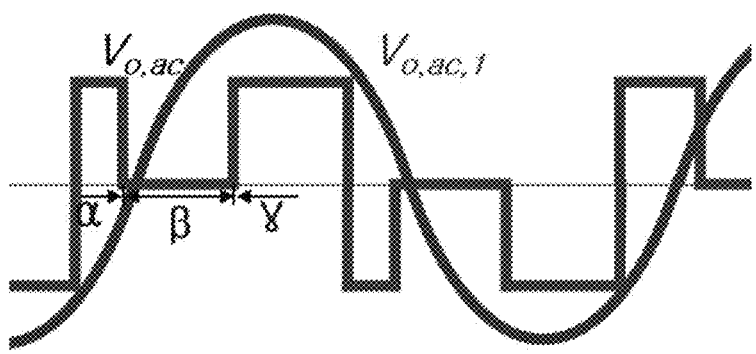
Figure 7C:
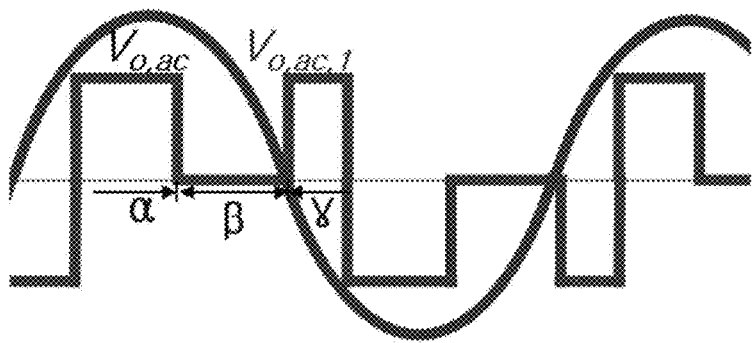
Figure 8:
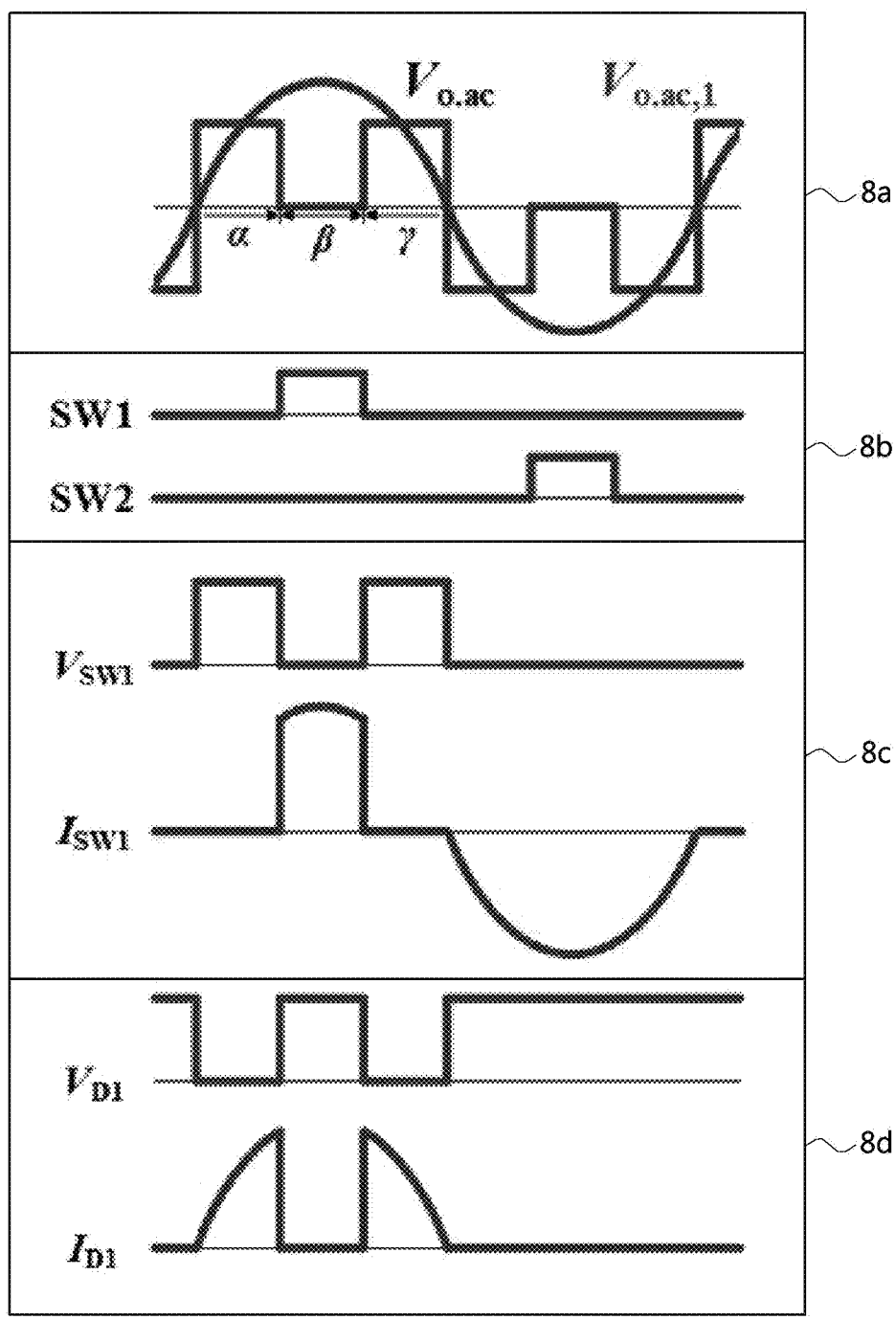
FIG. 8 is a graph illustrating operation waveforms of main elements when operating a bridgeless rectifier using switches in the wireless power reception circuit according to FIG. 6B.

FIGS. 7A to 7C are graphs for explaining a method of performing operational control of switches in the wireless power reception circuit according to FIG. 6B. FIG. 8 is a graph illustrating operation waveforms of main elements when operating a bridgeless rectifier using switches in the wireless power reception circuit according to FIG. 6B.

In the wireless power reception circuit of FIG. 6B, when operation of the switching elements of the bridgeless rectifier is controlled so that the resonance frequency and the operation frequency coincide with each other according to the varying output voltage $V_{o.ac,1}$, the output impedance may vary depending on a switching time and a duty. Further, a reflection impedance may appear on the side where the reception coil $L_S$ is present according to the output impedance. The reflection impedance affects the input impedance of the primary side including the reception coil $L_S$, so that a phase angle of the input impedance may change. Therefore, the resonance frequency of the wireless power reception circuit may be adjusted according to the change of the input impedance.

As shown in FIGS. 7A to 7C, it may be identified that the duty of the output voltage $V_{o.ac}$ of the compensation network of FIG. 6B is changed by performing the pulse width modulation (e.g., changing α, β, γ by adjusting the switching time and period) using the first switch and the second switch according to FIG. 6B. In addition, the graphs of $V_{o.ac,1}$ shown in sinusoidal waveforms in FIGS. 7A to 7C illustrate a fundamental wave component with respect to the output voltage $V_{o.ac}$.

Here, α, β, γ according to FIGS. 7A to 7C may be referred to as a pulse width alpha (α), a pulse width beta (β), and a pulse width gamma (γ), respectively.

FIG. 7A shows a case where the duty of the output voltage $V_{o.ac}$ is generated in the center of the half-period of the output voltage $V_{o.ac}$. In this case, it may be expected that the output impedance ($Z_{o.ac}$ in FIG. 6B) appears as a resistor because the phases of the fundamental wave $V_{o.ac,1}$ of the output voltage $V_{o.ac}$ and the output current $I_{o.ac}$ are the same.

As shown in FIG. 7B, when the width α is made smaller than that in FIG. 7A, since the fundamental wave $V_{o.ac,1}$ of the output voltage $V_{o.ac}$ has a lagging phase with respect to the phase of the output current $I_o$, it may be expected that the output impedance ($Z_{o.ac}$ in FIG. 6B) becomes capacitive.

As shown in FIG. 7C, when the width α is made larger than that in FIG. 7A, since the fundamental wave $V_{o.ac,1}$ of the output voltage $V_{o.ac}$ has a leading phase with respect to the phase of the output current $I_o$, it may be expected that the output impedance ($Z_{o.ac}$ in FIG. 6B) becomes inductive.

As shown in FIG. 8, when the same timing is applied with respect to a graph 8a according to the switch control of FIG. 7A, a graph 8b related to the control of the first switch SW1 and the second switch SW2 of FIG. 6B, a graph 8c showing a voltage $V_{SW1}$ and a current $I_{SW1}$ at the first switch SW1 of FIG. 6B, and a graph 8d showing a voltage $V_{D1}$ and a current $I_{D1}$ at the first diode D1 of FIG. 6B may be identified.

Figure 9:
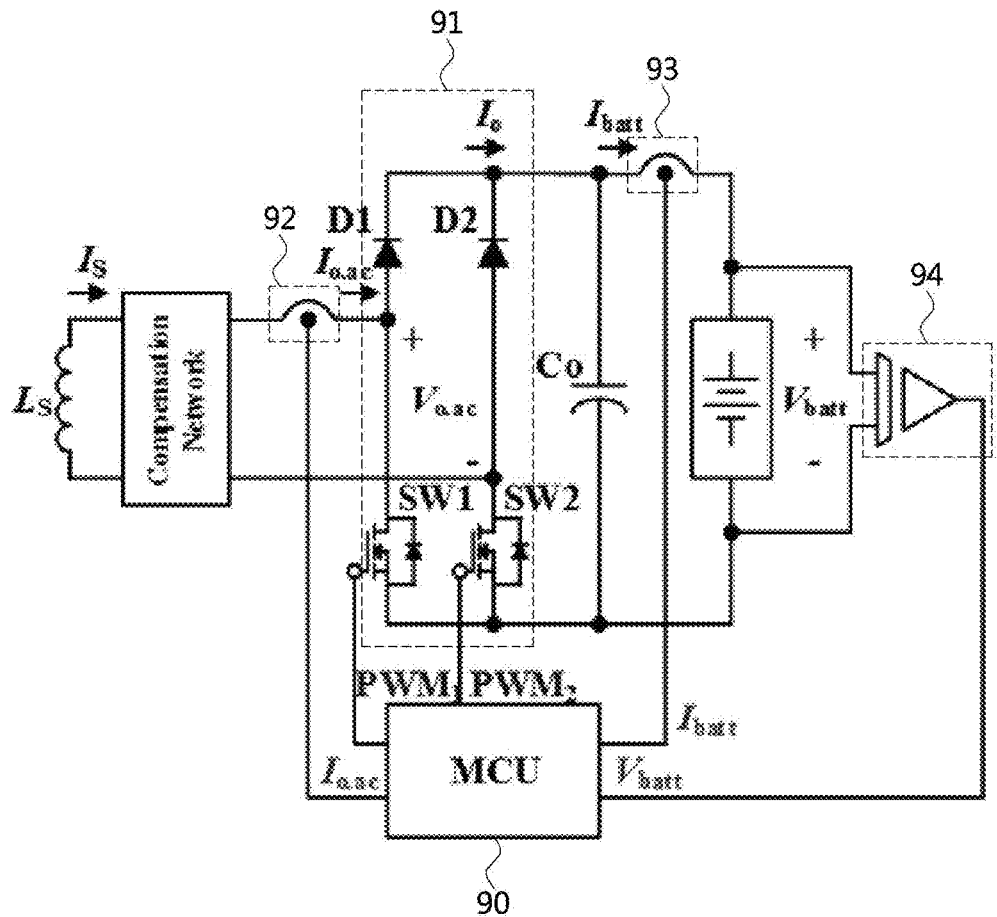
FIG. 9 is a circuit diagram illustrating an example circuit of a power reception apparatus including a bridgeless rectifier in an EV WPT system according to embodiments of the present disclosure.

FIG. 9 is a circuit diagram illustrating an example circuit of a power reception apparatus including a bridgeless rectifier in an EV WPT system according to embodiments of the present disclosure.

As shown in FIG. 9, a power reception apparatus may include a bridgeless rectifier 91 rectifying a power transferred from the reception coil $L_S$ and supplying a rectified DC power to a battery built in the EV, and a controller 90 for controlling operation of the bridgeless rectifier 91.

Here, the bridgeless rectifier 91 may include at least one switch and at least one diode connected to the at least one switch. Also, the bridgeless rectifier 91 may include a first series circuit in which the first switch SW1 and the first diode D1 are connected in series and a second series circuit in which the second switch SW2 and the second diode D2 are connected in series. Also, the first series circuit and the second series circuit may be connected in parallel.

Here, the bridgeless rectifier 91 may have one terminal ($V_{o.ac}+$) between the first switch SW1 and the first diode D1 and the other terminal ($V_{o.ac}-$) between the second switch SW2 and the second diode D2, and may receive the power transferred from the reception coil $L_S$ using the terminals. The power transferred from the reception coil $L_S$ may be received through a compensation network.

Here, the controller 90 may control operation of the bridgeless rectifier 91 by adjusting the switching time and period of the at least one switch, and may be referred to as a micro control unit (MCU).

Here, the power reception apparatus may further include ammeters 92 and 93 for sensing at least one of a current transferred from the reception coil and a current supplied to the battery. Also, the power reception apparatus may further include a voltmeter for sensing the voltage of the battery, or a watt-hour meter 94.

The controller 90 may control operation the first switch SW1 and the second switch SW2 based on the current transferred from the reception coil $L_S$ so that the operation frequency of the bridgeless rectifier 91 matches the resonance frequency of the reception coil $L_S$. The controller 90 may control operation the first switch SW1 and the second switch SW2 based on the voltage $V_{batt}$ of the battery so that the pulse width β of the voltage $V_{o.ac}$ transferred from the reception coil $L_S$ changes. The controller 90 may control operation of the first switch SW1 and the second switch SW2 based on the voltage $V_{batt}$ of the battery so that the pulse width α of the voltage $V_{o.ac}$ transferred from the reception coil $L_S$ changes. Here, the pulse width α and the pulse width β may be referred to the descriptions of FIGS. 7A to 7C.

Meanwhile, the controller 90 for controlling operation of the bridgeless rectifier 91 may include at least one processor and a memory that stores instructions that direct the at least one processor to perform at least one step.

Here, the at least one step may comprise a step of sensing a power $I_{o.ac}$ and $V_{o.ac}$ transferred from the reception coil $L_S$ or an output power to the battery, and a step of controlling the bridgeless rectifier 91 based on the sensed result.

Here, in the step of controlling, operation of the at least one switch included in the bridgeless rectifier 91 may be controlled based on the current $I_{o.ac}$ transferred from the reception coil $L_S$. Also, in the step of controlling, operation of the at least one switch included in the bridgeless rectifier 91 may be controlled based on the voltage $V_{batt}$ of the battery. Also, in the step of controlling, operation of the at least one switch included in the bridgeless rectifier 91 may be controlled based on the output power of the battery.

Here, in the step of controlling, operation of the at least one switch may be controlled based on the current $I_{o.ac}$ transferred from the reception coil $L_S$, so that the operation frequency of the bridgeless rectifier 91 matches the frequency of the power $I_{o.ac}$ and $V_{o.ac}$ transferred from the reception coil $L_S$.

Here, in the step of controlling, operation of the at least one switch may be controlled based on the voltage $V_{batt}$ of the battery, so that the pulse width β of the voltage $V_{o.ac}$ transferred from the reception coil $L_S$ changes.

Here, in the step of controlling, operation of the at least one switch may be controlled based on the output power of the battery, so that the pulse width α of the voltage $V_{o.ac}$ transferred from the reception coil $L_S$ changes.

Figure 10:
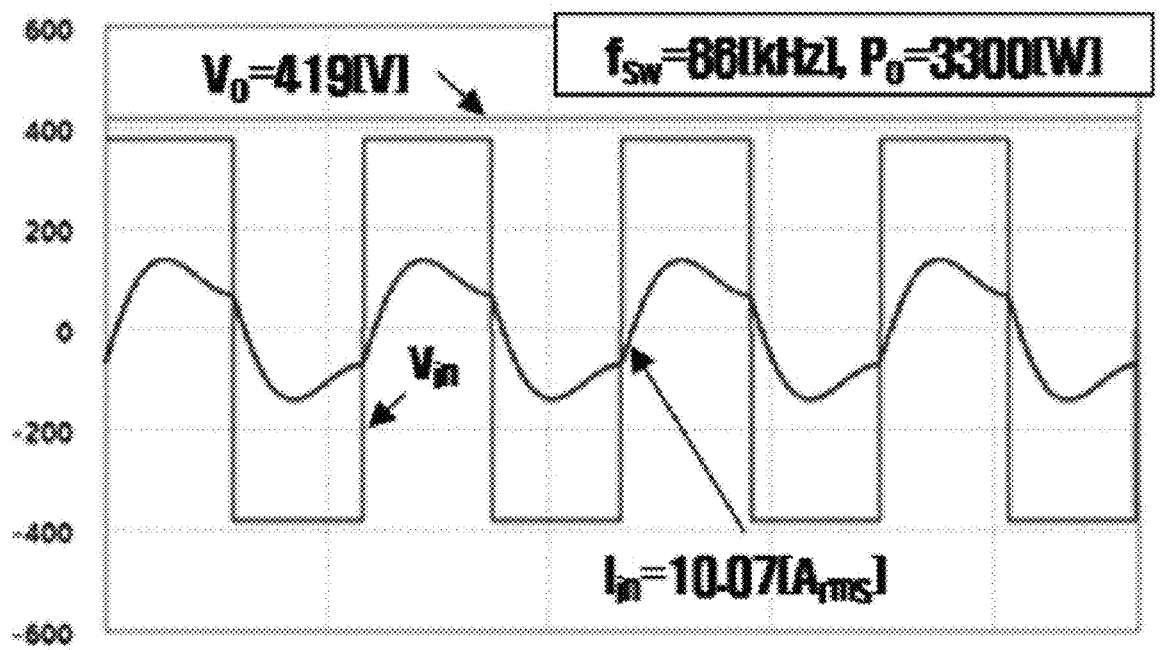
FIG. 10 is a graph illustrating experimental results of applying a power reception apparatus including a bridgeless rectifier in an EV WPT system according to embodiments of the present disclosure.
Figure 11:
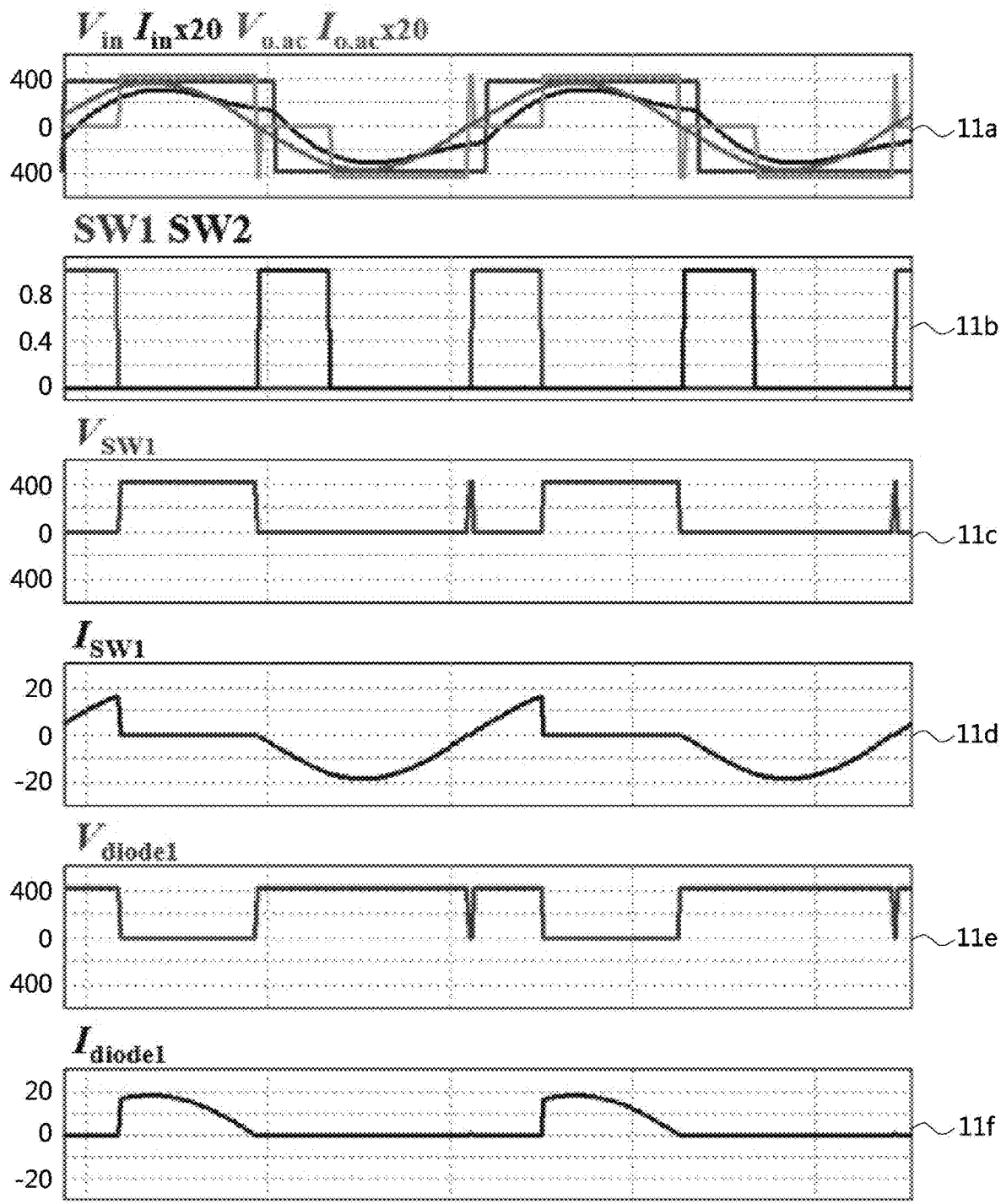
FIG. 11 is a graph illustrating a main operation of a power reception apparatus including a bridgeless rectifier according to embodiments of the present disclosure.

FIG. 10 is a graph illustrating experimental results of applying a power reception apparatus including a bridgeless rectifier in an EV WPT system according to embodiments of the present disclosure. FIG. 11 is a graph illustrating a main operation of a power reception apparatus including a bridgeless rectifier according to embodiments of the present disclosure.

In the case of FIG. 5A, as described above, the rated power $P_o$ of the VA was reduced by applying a Zero Phase Angle (ZPA) control. However, since the primary side resonance frequency and the secondary side resonance frequency became different from each other, only the power of at most 2.7 kW was transferred. Also, as shown in FIG. 5B, when the operation frequency was set to be the secondary resonance frequency, the power of 3.3 kW was transferred, but the phase difference between the input voltage and the input current was increased so as to increase the rated power of the VA.

When FIG. 10 is compared with the graphs of FIGS. 5A and 5B, it may be confirmed that the power transferred to the battery in the WPT system increased from the existing 2.7 kW to 3.3 kW even when the ZPA control was applied. Also, as the ZPA control became possible, the input current ($I_{in}$, see FIG. 4) was reduced to 10.07 Arms and the rated power of the VA decreased.

As shown in FIG. 11, detailed voltage and current waveforms appearing in each element during the operation of the bridgeless rectifier may be confirmed. Specifically, referring to graph 11a with respect to the wireless power reception circuits according to FIGS. 4 and 9, the input voltage and current on the transmission coil side and the output voltage and current on the reception coil side may be confirmed.

Also, as shown in graph 11b, ON/OFF operations of the first switch SW1 and the second switch SW2 in FIG. 9 may be confirmed. As shown in a graph 11c, the voltage variation of the first switch in FIG. 9 may be confirmed. As shown in a graph 11d, the current fluctuation of the first switch may be confirmed. As shown in a graph 11e, the voltage of the first diode of the first diode in FIG. 9 may be confirmed. As shown in a graph 11f, the current of the first diode of the first diode in FIG. 9 may be confirmed.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa. Also, the above-described method or apparatus may be implemented by combining all or a part of the structure or functions, or may be implemented separately.

Furthermore, the above-mentioned method or apparatus may be implemented by combining all or a part of the configuration or function, or may be implemented separately.

While the embodiments of the present disclosure and their advantages have been described in detail, it should be understood that various changes, substitutions, and alterations may be made herein without departing from the scope of the present disclosure.

What is claimed is:

1. A wireless power reception apparatus including a bridgeless rectifier in a wireless power transfer (WPT) system for an electric vehicle (EV), the wireless power reception apparatus comprising:
    a bridgeless rectifier configured to rectify power transferred from a reception coil and to supply a direct current to a battery mounted in the EV; and
    a controller configured to control operation of the bridgeless rectifier,
    wherein the bridgeless rectifier includes at least one switch and at least one diode connected to the at least one switch, and
    wherein the controller is configured to control the operation of the bridgeless rectifier by adjusting a switching time and a period of the at least one switch to change a pulse width of a voltage transferred from the reception coil based on an output power of the battery or based on a voltage of the battery,
    wherein the controller sets a pulse width α as a first value such that a duty of the voltage transferred from the reception coil to be generated in accordance with a center of half-period of the output voltage to render an output impedance of the bridgeless rectifier operating as a resistor,
    wherein the controller sets the pulse width α as a second value smaller than the first value to render the output impedance capacitive, and
    wherein the controller sets the pulse width α as a third value larger than the first value to render the output impedance inductive.

2. The wireless power reception apparatus according to claim 1, wherein the bridgeless rectifier includes:
    a first series circuit in which a first switch and a first diode are connected in series; and
    a second series circuit in which a second switch and a second diode are connected in series and configured in parallel with the first series circuit.

3. The wireless power reception apparatus according to claim 2, wherein the bridgeless rectifier is configured to receive the power transferred from the reception coil using one terminal between the first switch and the first diode and another terminal between the second switch and the second diode.

4. The wireless power reception apparatus according to claim 3, wherein the power transferred from the reception coil is received through a compensation network.

5. The wireless power reception apparatus according to claim 3, further comprising an ammeter configured to sense at least one of a current transferred from the reception coil and a current supplied to the battery.

6. The wireless power reception apparatus according to claim 5, further comprising a voltmeter configured to sense a voltage of the battery.

7. The wireless power reception apparatus according to claim 6, wherein the controller is configured to control operation of the first switch and the second switch based on the current transferred from the reception coil, such that an operation frequency of the bridgeless rectifier matches a resonance frequency of the reception coil.

8. The wireless power reception apparatus according to claim 6, wherein the controller is configured to control operation of the first switch and the second switch based on the voltage of the battery, such that a pulse width β of a voltage transferred from the reception coil changes.

9. An apparatus for controlling operation of a bridgeless rectifier configured to rectify power transferred from a reception coil and to supply a direct current to a battery mounted in an electric vehicle (EV), the apparatus comprising at least one processor and a memory storing at least one instruction executable by the at least one processor, wherein, upon execution of the at least one instruction, the at least one processor is configured to:
    sense a power transferred from the reception coil or an output power supplied to the battery; and
    control the operation of the bridgeless rectifier based on the sensed power transferred from the reception coil or output power supplied to the battery by adjusting a switching time and a period of the at least one switch to change a pulse width of a voltage transferred from the reception coil based on an output power of the battery or based on a voltage of the battery,
    wherein the at least one processor is further configured to set a pulse width a as a first value such that a duty of the voltage transferred from the reception coil to be generated in accordance with a center of half-period of the output voltage to render an output impedance of the bridgeless rectifier operating as a resistor,
    wherein to set the pulse width α as a second value smaller than the first value to render the output impedance capacitive, and
    wherein to set the pulse width a as a third value larger than the first value to render the output impedance inductive.

10. The apparatus according to claim 9, wherein the at least one processor is configured to control operation of at least one switch included in the bridgeless rectifier based on a current transferred from the reception coil.

11. The apparatus according to claim 10, wherein the at least one processor is configured to control the operation of the at least one switch based on the current transferred from the reception coil, such that an operation frequency of the bridgeless rectifier matches a frequency of the power transferred from the reception coil.

12. The apparatus according to claim 9, wherein the at least one processor is configured to control the operation of the at least one switch based on the voltage of the battery, such that a pulse width β of a voltage transferred from the reception coil changes.

* * * * *